US007493287B1

(12) United States Patent
Sequeira

(10) Patent No.: US 7,493,287 B1
(45) Date of Patent: Feb. 17, 2009

(54) DISTRIBUTED CONTENT ARCHITECTURE

(75) Inventor: William J. Sequeira, Evergreen, CO (US)

(73) Assignee: Digital Merchant, Inc., Menlo Park, CA (US)

( * ) Notice: Subject to any disclaimer, the term of this patent is extended or adjusted under 35 U.S.C. 154(b) by 545 days.

(21) Appl. No.: 10/048,306

(22) PCT Filed: Jul. 26, 2000

(86) PCT No.: PCT/US00/20327

§ 371 (c)(1),
(2), (4) Date: Jan. 25, 2002

(87) PCT Pub. No.: WO01/09749

PCT Pub. Date: Feb. 8, 2001

(51) Int. Cl.
*G06Q 99/00* (2006.01)
(52) U.S. Cl. .............................. 705/50; 705/41; 705/39
(58) Field of Classification Search ................. 709/204; 705/41, 54, 39, 18; 715/501; 700/286; 707/8
See application file for complete search history.

(56) References Cited

U.S. PATENT DOCUMENTS

| 5,590,381 | A | | 12/1996 | Mourad ...................... 395/872 |
| 5,734,719 | A | | 3/1998 | Tsevdos et al. ................ 380/5 |
| 5,751,958 | A | * | 5/1998 | Zweben et al. .............. 709/204 |
| 5,920,864 | A | | 7/1999 | Zhao ........................... 707/10 |
| 6,055,522 | A | | 4/2000 | Krishna et al. .............. 705/517 |
| 6,081,840 | A | | 6/2000 | Zhao ........................... 709/224 |
| 6,490,567 | B1 | * | 12/2002 | Gregory ....................... 705/39 |
| 2001/0011250 | A1 | * | 8/2001 | Paltenghe et al. ............. 705/41 |
| 2002/0091725 | A1 | * | 7/2002 | Skok ....................... 707/501.1 |
| 2003/0191719 | A1 | * | 10/2003 | Ginter et al. .................. 705/54 |
| 2004/0193329 | A1 | * | 9/2004 | Ransom et al. ............. 700/286 |
| 2005/0114218 | A1 | * | 5/2005 | Zucker et al. ................. 705/18 |

OTHER PUBLICATIONS

Loring Wirbel, Network Technologies, May 2, 1994, Electronic Engineering Times, p. 42.*
Abolhassani, M. and G. Szentivanya; *A Component-Oriented Approach for Enterprise-Devoted E-Commerce*; Delft University of Technology.
Curtis, K. and O. Draper; *Multimedia Content Management—Provision of Validation and Personalisation Services*; 1999; IEEE.
Szentivanyi, G. and P. Kourzanov; *A Generic, Distributed and Scalable Multimedia Information Management Framework Using CORBA*; 1999, IEEE.

* cited by examiner

*Primary Examiner*—James P. Trammell
*Assistant Examiner*—Behrang Badii
(74) *Attorney, Agent, or Firm*—Anthony T. Cascio

(57) ABSTRACT

A distributed content architecture is provided the de-coupled site management and presentation from asset inventory management and publishing. An active content cell is provided which manages the inventory and publishing aspects of the information. A content management server is provided that resides at any site and that effects content commerce. The active content cell resides at a content publisher's site and is under content publisher's control. Thus, the invention enables a virtual content market in which content is controlled by the content publisher while commercial transactions are separately controlled by a content management server. Active content cells are site independent such that multiple active content cells can co-exist in one location or be geographically dispersed. Further, active content cells have a unique IP address and register the location just as any other site although their behavior is different. The invention further provides a transaction protocol as effected between the active content cells and contents managers.

22 Claims, 7 Drawing Sheets

DISTRIBUTED CONTENT ARCHITECTURE

BACKGROUND OF THE INVENTION

1. Technical Field

The invention relates to asset inventory management publishing and related asset transactions. More particularly, the invention relates to a distributed content architecture supporting commercial transactions.

2. Description of the Prior Art

At this point there is not much to be added to the Internet discussion. It is a well known and accepted medium that is used everyday by millions of people for transactions of all sorts. What can be said is that new uses are being found for the Internet all the time. One example of such use is the popular website eBay which provides an efficient market for the exchange of items between buyers and sellers using an auction metaphor. EBay demonstrates that the Internet is a very good mechanism for brokering transactions between many sellers and many buyers, where both the sellers and buyers are individuals or small organizations having limited infrastructure. Such medium could also provide an efficient market for the sale and licensing of content, e.g. art, music, information, and video, for example for artists, photographers, scholars, or musicians.

Much work has already been performed in this regard. See, for example the following:

A. Mourad, Method and apparatus for buffered video playback of video content distributed on a plurality of disks, U.S. Pat. No. 5,590,381 (Dec. 31, 1996) discloses playback of video content distributed on disks in successive data blocks for a plurality of viewers. The disclosed technique involves accessing data for each viewer from a different one of the blocks on the disks within a time cycle, placing the accessed data from each block in respective buffers, reading out the data in the buffers sequentially in common cycles, and reading out the cycles. Preferably, the content is in successive blocks over the discs on a round robin basis, and accessing includes accessing different blocks on the same disk within the time cycle. This patent covers video served from multiple drives into a buffering hierarchy.

Y, Zhao, Two-level content distribution system, U.S. Pat. No. 6,081,840 (Apr. 25, 2000) discloses a system for efficiently distributing computer data files to remotely located end users over a communications network, such as the Internet. A source server is maintained with all of the data files for use by the end users. Several local servers are connected to the source server and contain subsets of the data contained in the source server. Users connect to a local server and request a data file. If the file is located at the local server, it is provided by the local server without the need to contact the source server. If the file is not located at the local server, the source server is contacted by the local server to get the file for the user. The local server monitors data file usage and can update the data it maintains locally based upon the determined usage. Various management functions are used at the source and local servers to coordinate the file transfers and inventory table updating. Different communications protocols are used for the data transfers to enhance the security of the system from user access to data only available to servers.

B. Krishna, J. Melbin, D. Latham, Automatic page converter for dynamic content distributed publishing system, U.S. Pat. No. 6,055,522 (Apr. 25, 2000) disclose a Page Builder software program that operates in connection with a dynamic content publishing program, such as FutureTense Designer™. The Page Builder program accepts a dynamic content publication file as input and generates one or more hypertext markup language (HTML) pages for each navigable state of the dynamic content file. As a result, the dynamically specified content is encapsulated in a set of Web pages that may be displayed by a browser which does not have a viewer program applet or plug-in. This provides a capability for producing dynamic content publications, such as Web pages, while eliminating the need to download specialized Viewer applets or otherwise to make use of modified or programming-enabled browser programs.

Y, Zhao, Multi-level category dynamic bundling for content distribution, U.S. Pat. No. 5,920,864 (Jul. 6, 1999) discloses a system and method for retrieving the contents of a digital information system by multi-level categorization. The system uses a file table, a category table, and a category bundling table. Headings and directions are displayed on navigation pages to guide the user to the desired file. The description and hierarchy relationship of categories, sub-categories, and files are stored in the tables. When the user selects a category or file and the direction of navigation, the system returns the file, or consults the tables and returns a list of new categories and files for a new navigation page. Moving down and then up through a category usually produces a different navigation page. Dynamic updating of the system categories and files can be accomplished by altering the content of the tables.

J. Tsevdos, R. Cook, N. Ring, R. Barnhill. G. Hamblin, K. Milsted, C. Kindell, S. Waefler, C. Portela, B. Anderson, Digital information accessing, delivery and production system, U.S. Pat. No. 5,734,719 (Mar. 31, 1998) disclose a digital data on-demand turnkey system at a customer premise wherein N number of servers provide for 100% of content distribution of remotely stored digitized information, which information may be previewed in real-time, and product incorporating selected digitized information can be manufactured on-site and within a short response time to a customer's request at a point of sale location. In a retail environment customers, at a point-of-sale location, are able to exhaustively search and preview the content database using graphics-based touch screens at consumer kiosks. Previews including audio and video segments are made available. Prompting screens allow customers to make purchasing decisions by stipulating content which is available from any number of categories of subject matter including music. The selected media for the manufacture and production of the digital data may be from a myriad of different selections and can include CD's, cassette tapes, CD ROM technology, reel-to-reel tapes, and video disks, as an example. A master server is situated geographically so as to be accessible to chain and network subservers. Its geographic and networked location is dependent upon communication network systems and subsystem costs and availability in order to best serve a customer's premise, whether it is a retail store or similar point-of-sale or other end-user location. Security mechanisms that require centralized database authorizations prior to the transmission of content and/or the manufacture of any of the products is provided in addition.

None of the prior art addresses the issue of a virtual marketplace for content where many content providers seek to market their content across a ubiquitous distribution channel, such as the Internet, without the need to surrender control of such content to a central repository. It would be advantageous to provide a distributed content architecture that de-couples site management and presentation from asset inventory management and publishing to facilitate such virtual marketplace for content.

SUMMARY OF THE INVENTION

The invention provides a distributed content architecture. The architecture decouples site management and presentation from asset inventory management and publishing, while supporting distributed commercial transactions This is accomplished by the provision of an active content cell which manages the inventory and publishing aspects of information. A content manager server resides at any site that effects content commerce. The active content cell resides at a content publisher's site under publisher's control, thus enabling a virtual content market. Active content cells are site independent. Thus, multiple active content cells can co-exist in one location or be geographically dispersed. Active content cells have a unique IP address and register their location just as any other site. However, their behavior is different. The invention also provides a transaction protocol that is executed between the active content cells and the content manager servers.

DETAILED DESCRIPTION OF THE INVENTION

Figure 1:
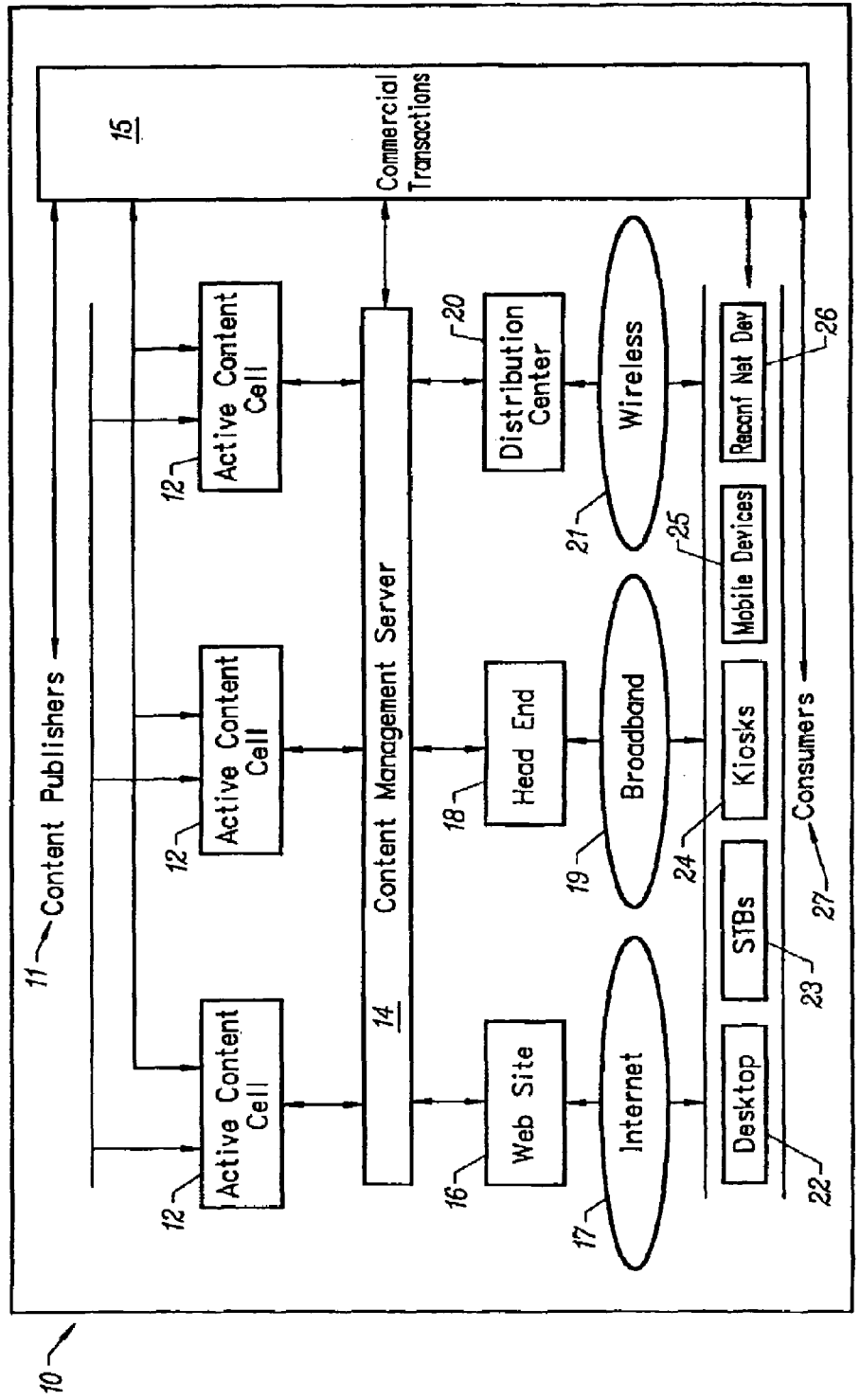
FIG. 1 is a block schematic diagram that shows a distributed content architecture according to the invention.

The invention herein is a distributed content architecture that de-couples site management and presentation from asset inventory management and publishing. The preferred embodiment of the invention employs an active content cell which manages the inventory and publishing aspects of information. The preferred embodiment of the invention is implemented with the recognition that creators and owners of content, such as authors and musicians, do not necessarily want to operate commercial websites, i.e. they do not want to spend their time and creative energy running an e-commerce system. However, such individuals do want a method of managing their content and to distribute it as widely as possible so that it can receive wide exposure to the public, resulting (it is hoped) in sales. Consequently, the architecture herein disclosed is also a content distribution network for content commerce.

In the preferred embodiment of the invention, all files reside on a remote server and only indices of content are made available to websites, not the files themselves. A physical copy of the file is sent only after a commercial transaction is made. Hence, contact is always made directly between the website and the server controlling the digital asset. Such approach implements what is referred to herein as distributed content management. This mechanism promotes such marketing of content as digital asset publishing, distributed digital asset transactions, the engendering of a digital asset management appliance, and author-centric digital asset publishing. This latter aspect of the invention extends the eBay model for an efficient market to small studios and others having limited infrastructure (without the auction metaphor in most applications) for content as opposed to collectibles and other physical items. That is, the content is located in diverse locations but transactions therefor may be administered centrally or through a portal.

The invention includes a content manager server that resides at any site and that effects content commerce. The active content cell resides at a content publisher's site under the publisher's control. This enables a virtual content market. Active content cells are site independent. That is, multiple active content cells can co-exist in one location or be geographically dispersed. Active content cells have a unique IP address and register their location just as any other site. Thus, active content cells have a unique domain address (as any other web site) and register with content manager servers across the web. Registration can occur point-to-point (one active cell with a content manager server) or in broadcast mode (a new active cell contacts a designated active cell which has the task of registering new cells with all known sites). The system described herein focuses on the point-to-point registration but could easily include the broadcast mode.

The invention also provides a transaction protocol that is executed between active content cells and content managers.

In the preferred embodiment of the invention, the content management protocol is a set of functions that are overlayed on standard protocols. At this point in time, the preferred standards are XML and SSL, which are both well known in the art.

Three classes of metatags are embedded within XML to address each of the following:

(a) Distribution and manipulation of ACC content indices, i.e. get an index, augment an index, search for content within an index, etc. The tags in this case identify a content index and its components.

(b) Specification of the asset format required, e.g. should the asset be formatted to fit in a Palm, WAP phone or PC when the asset is purchased? The tags in this case identify the format, the format metadata (how to read the format), and the how to retrieve the asset.

(c) Commercial transaction—tokens (by the way, tokens may be real money) are actually produced and sent. The tags are used to identify specific transactions.

SSL is used whenever the (c) cycle above is entered to guarantee a secure transaction between the active content cell and the content management server.

Note that this same protocol could be implemented using an extension of HTTP, e.g. HTTP-CMS, and using SHTTP. Hence, the functionality is created to support any number of standard protocols of choice.

The invention comprises a distributed content architecture that is discussed herein in connection with FIG. 1. The distributed content architecture (10) provides information available from various content publishers (11), such as for example photographs, drawings, video, and music, to various consumers (27) in the form of various commercial transactions, such as for example sale or licensing, handled by a commercial transaction engine (15).

The content publishers provide an active content cell (12) which manages the content inventory and publishing. The content is then advertised and sold via a content management server (14) through various distribution channels such as a web site (16), a head end (18), or a distribution center (20).

Each of these distribution channels contains its own distribution medium. For example, in the case of a website (16) the distribution medium is the Internet (17); in the case of a head end (18), the distribution medium is a broadband channel (19); and in the case of a distribution center (20), the distribution medium is a wireless medium (21).

The information or the content itself is provided to consumers by any available or contemplatable interacting device such as the consumer's desktop (21), a Set Top Box (STB) (23), a kiosk (24), a mobile device (25), or a reconfigurable net device (26).

Figure 2:
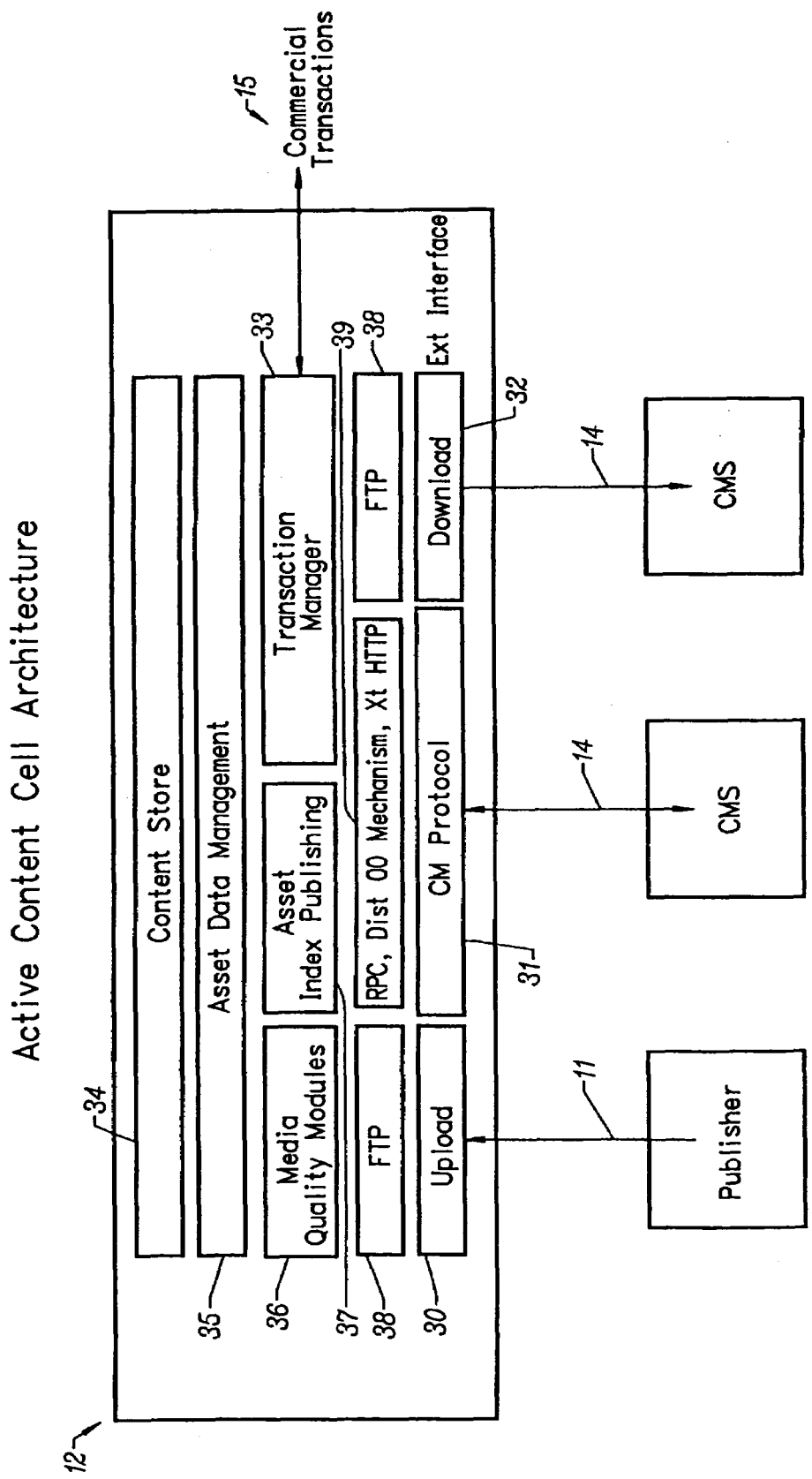
FIG. 2 is a block schematic diagram that shows an active content cell according to the invention.

The active content cell architecture is shown in FIG. 2. As can be seen in FIG. 2, the active content cell (12) receives content from a publisher (11) via an upload mechanism (30), such as File Transfer Protocol (FTP) or a simple Zip disk, and provides information to a content management server (14) via either content management protocol (31) or a download mechanism, such as FTP or via TCP/IP or UDP/IP-based protocols, which is part of an external interface (32). A transaction manager (33) captures commercial transactions and provides them to a transaction engine (15). The transaction manager (33) and transaction engine (15) preferably comprise an off-the shelf e-commerce system including code to translate the resulting amounts into the token system, or it may comprise plain cash movement between systems.

Within the active content cell (12) there is a content store (34) which contains the actual content to be distributed. Asset data management information (35) is provided that controls the manner in which the content may be distributed and provides such information as consumer license rights and obligations. The active content cell (12) also includes one or more media quality modules (36) which determine such aspects of the content as resolution, an asset index publishing module (37) which is useful in cataloguing the content to a search facility, an FTP mechanism (38), and various other distribution mechanisms (39), e.g. for web publishing.

The active content cell (12) is provided to store content. The active content cell (12) also manages content transactions, for example using tokens, such as micropayments, digital wallets, etc. The active content cell (12) can be used to advertise available content, enforce content quality assurance procedures, and separate content management from commercial store specifics. Thus, the active content cell (12) enables a distributed content market and can support monetary aggregation of transactions.

The content management server (14) centralizes the manipulation of asset data. The content management server performs hard currency transactions and distributes transaction value via a token mechanism. The content management server (14) also facilitates searching for content over a distributed network of active content cells (12), for example by maintaining an index of content. Finally, the content management server (14) can package content according to business rules, such as are designed to address branding and advertising, such as inclusion of banner ads, trailers, and company identification, and handle the transport medium over which the content is to be delivered.

Figure 3:
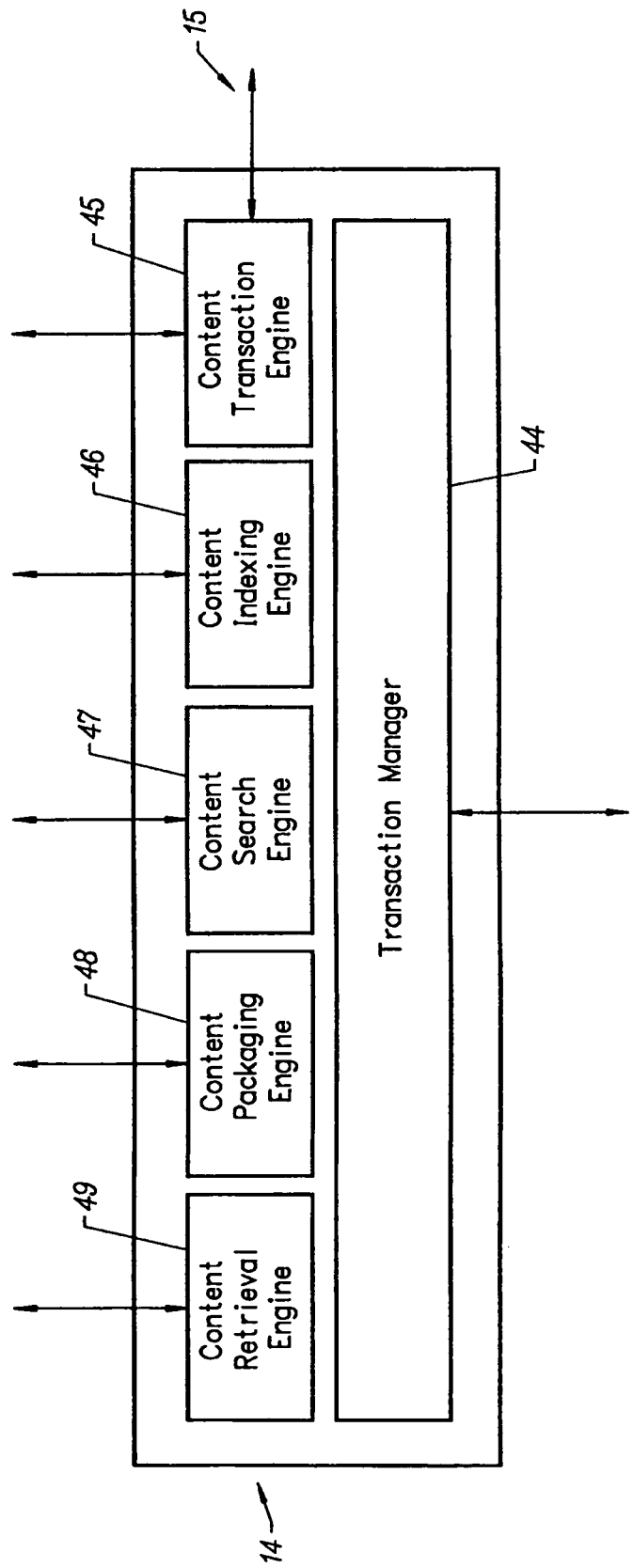
FIG. 3 is a block schematic diagram that shows a content management engine according to the invention.

FIG. 3 is a block schematic diagram of the content management server (14). In FIG. 3, it can be seen that the content management server (14) includes a transaction manager (44) for controlling transactions, as well as a content transaction engine (45) for performing currency transactions. The content management server (14) also includes a content indexing engine (46), a content search engine (47), a content packaging engine (48), and a content retrieval engine (49). Thus, the content management server (14) performs all of the transactions necessary to find, retrieve, account for, and deliver content, while the active content cell (12) itself contains the content and rights and transaction information associated with the content.

Figure 4:
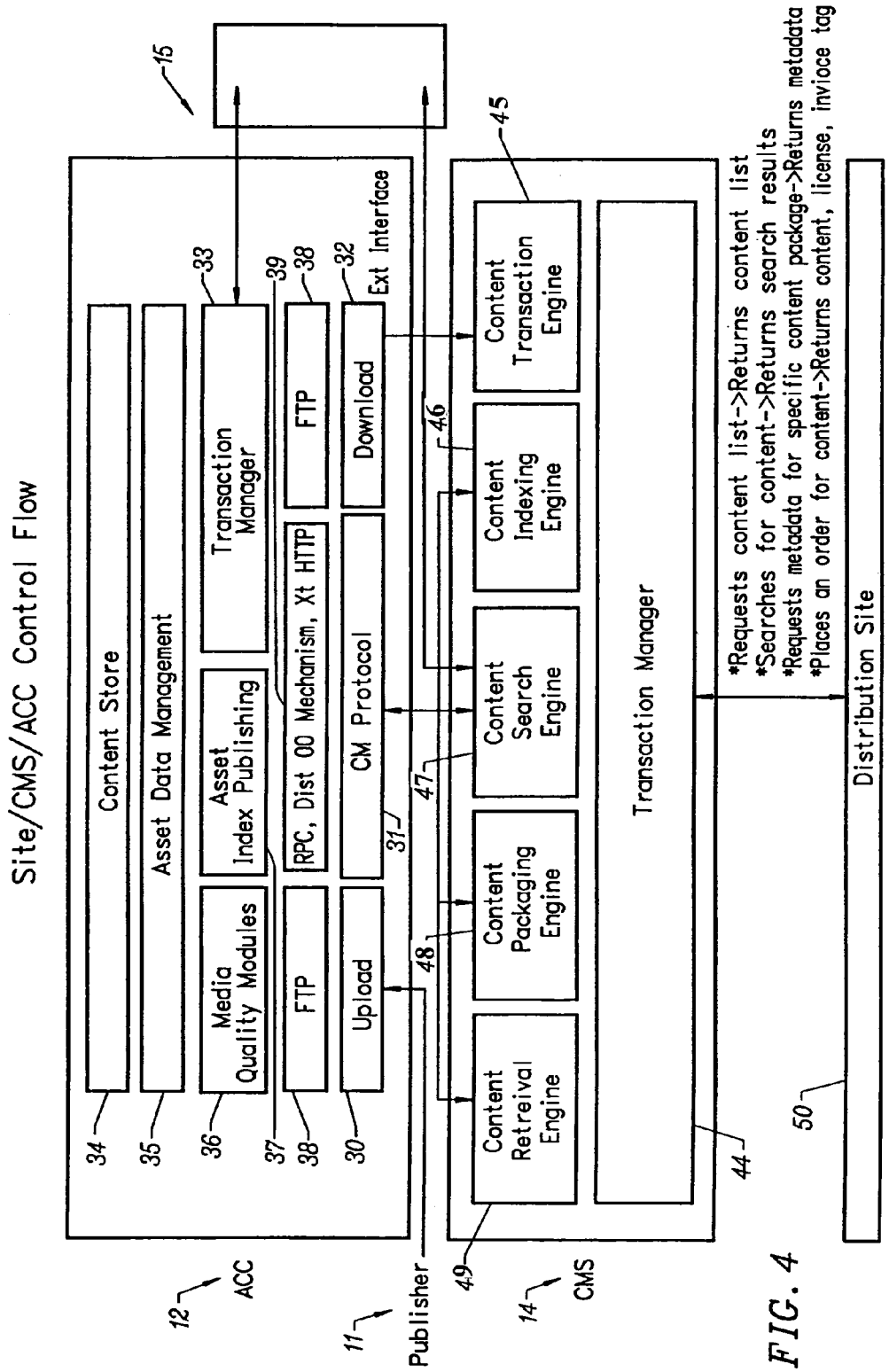
FIG. 4 is a block diagram that shows a site, a content management server, active content, and active content cell control flow according to the invention.

FIG. 4 is block schematic diagram that shows a site, content, a content management server, and active content cell control flow according to the preferred embodiment of the invention. In FIG. 4, an active content cell (12) is shown interacting with a content management server (14), a content publisher (11), and a distribution site (50).

In operation, the distribution site (50) is accessed. A content list is requested via the transaction manager (44) and returned to the distribution site (50). The content list is produced by the content indexing engine (46). A search for content, performed by the content search engine (47), returns search results. A request is performed for meta-data for a specific content package and the meta-data is returned. Finally, the distribution site (50) places an order on behalf of a consumer (27) for content. The content retrieval engine (49) returns the content including a license and an invoice tag. Transactions are cleared via the content transaction engine (45) and the transaction manager (33) through the commercial transaction engine (15).

In FIG. 4, the interaction between the active content cell (12) and the content management server (14) is readily seen as indicated by the connections between the various elements. Thus, the publisher (11) uploads content through an upload module (30) in the active content cell (12). The content is downloaded via a download module (32) in the active content cell (12) to the content retrieval engine (49) in the content management server (14). The transaction manager (44) is responsible for conducting the retrieved content to a distribution site (50).

Figure 5:
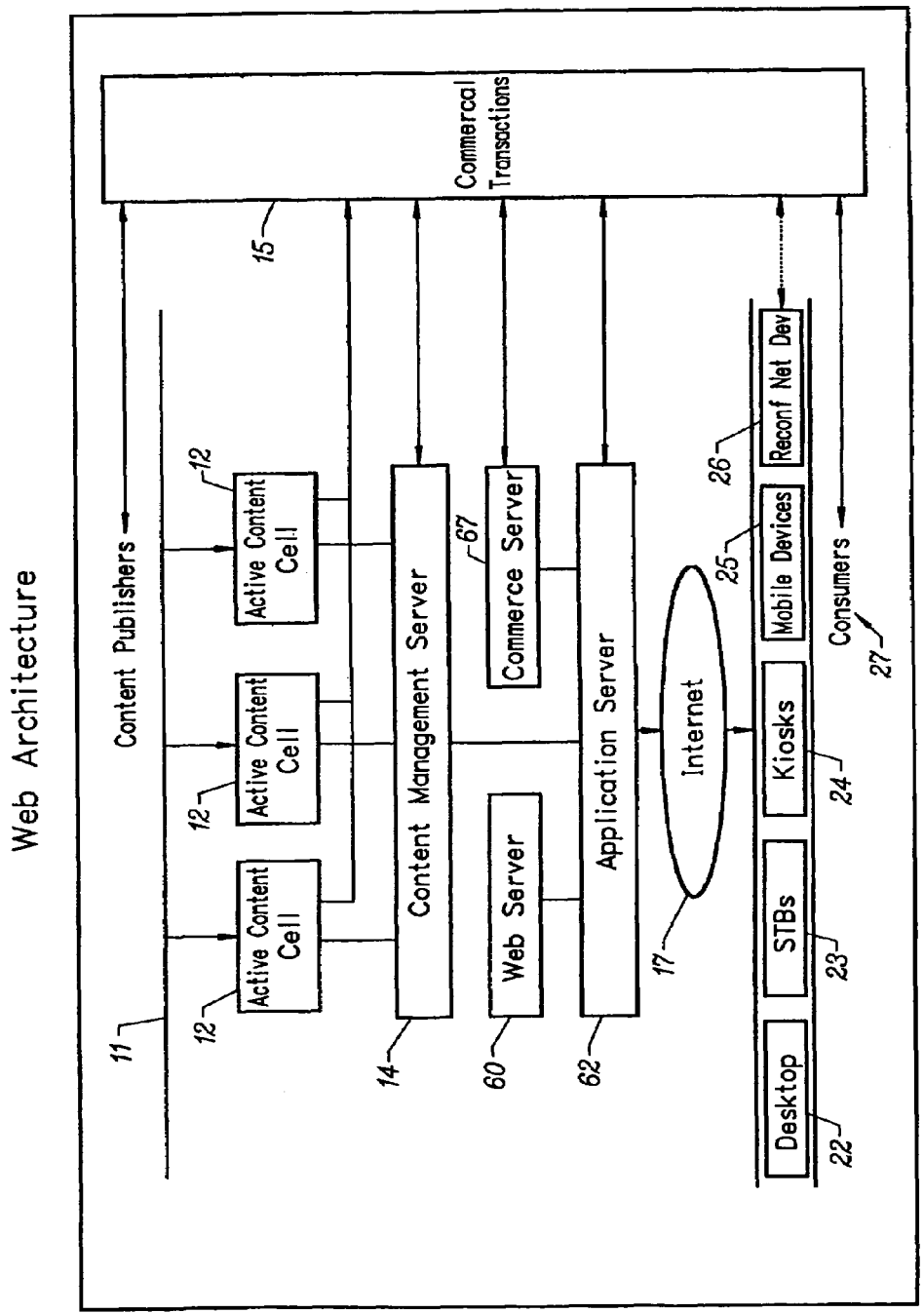
FIG. 5 is block schematic diagram that shows a web architecture according to the invention.

FIG. 5 is a block schematic diagram of a web architecture incorporating the invention. Architecturally, the active content cell (12) and content management server (14) interact with each other as discussed above and with the commercial transaction engine (15). The content management server (14) also includes an application server (62) which provides both a web server (60) and a commerce server (61). The application server (62) web server (60), and commerce server (61) may be collocated with the content management server (14) or they may be remotely located. The application server (62) provides an interface for the content management server (14) to the Internet (17). Hence, the system is accessible to consumers (27) via any Internet-enabled device as described above.

Figure 6:
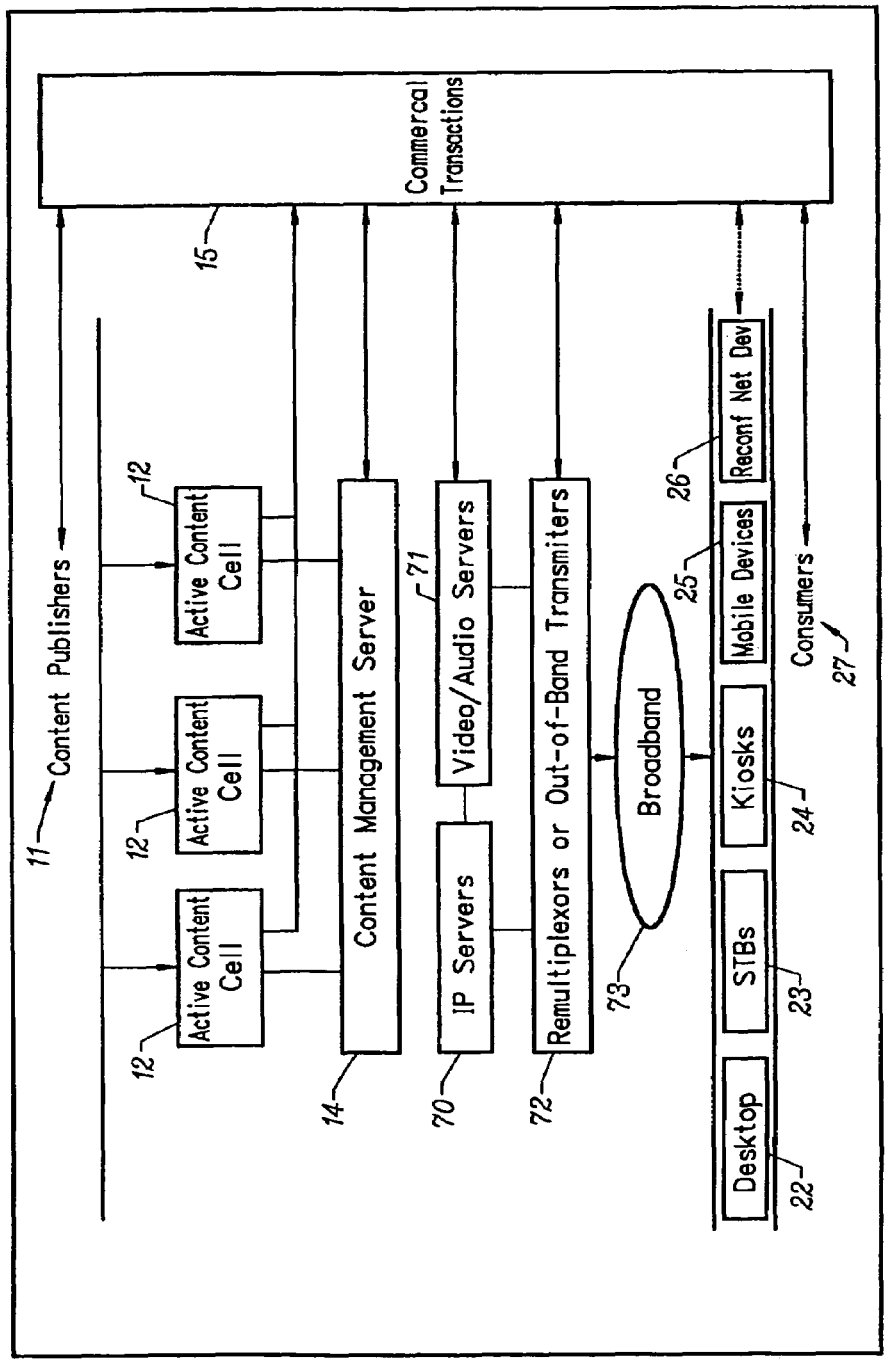
FIG. 6 is a block schematic diagram that shows a broadband architecture according to the invention.

FIG. 6 shows a broadband architecture for a preferred embodiment of the invention. As discussed above, the active content cell (12) and content management service (14) cooperate as described. This embodiment of the invention provides one or more IP servers (70) and one or more video/audio servers (71) which interface to the content management server (14). The IP servers (70) and/or video/audio servers (71) are interfaced to a broadband network (73) via one or more remultiplexors or out of band transmitters (72).

Figure 7:
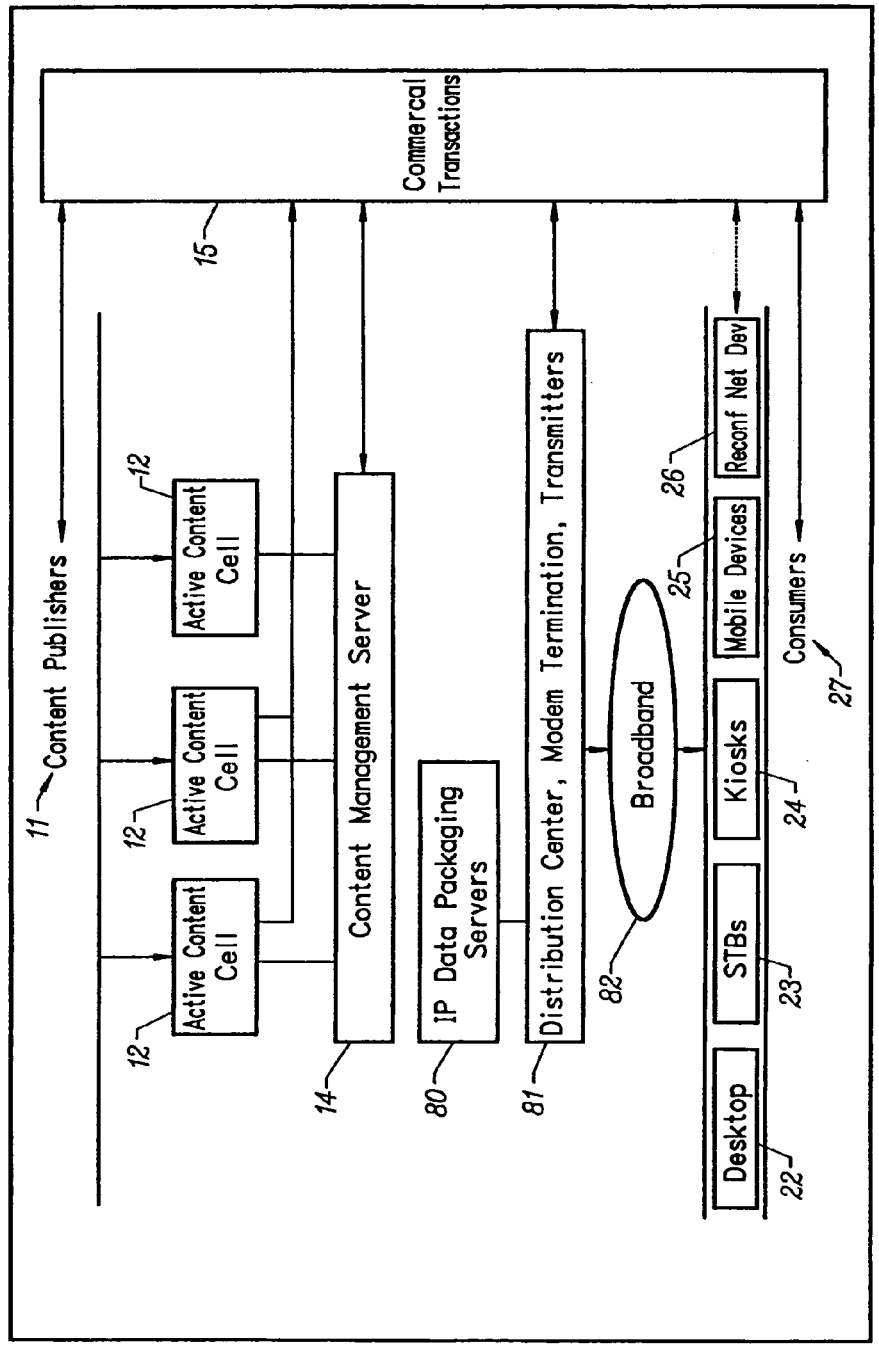
FIG. 7 is a block schematic diagram that shows a wireless architecture according to the invention.

FIG. 7 is a block schematic diagram that shows a wireless architecture for a preferred embodiment of the invention. As discussed above, the system architecture functions in accordance with the description herein. In this embodiment of the invention, the content management server (14) is interfaced to a wireless medium (82) via one or more IP data packaging servers (80) and a distribution center which includes modem termination and wireless transmitters (81).

Although the invention is described herein with reference to the preferred embodiment, one skilled in the art will readily appreciate that other applications may be substituted for those set forth herein without departing from the spirit and scope of the present invention.

For example, the active cell and the content management server are logical and can reside in the same machine. Further, because such systems are preferably implemented in software they can therefore be bundled as an appliance or installed in a single user machine, such as a personal computer.

While the system herein preferably handles commercial transactions, the system can work without requiring the execution of commercial transactions, e.g. for secure delivery and/or distribution of content in a non-commercial setting, for example in a file sharing network similar to that of Napster or Gnutella.

Accordingly, the invention should only be limited by the Claims included below.

The invention claimed is:

1. For a content distribution network having a distribution medium, distribution site and a plurality of interacting devices in communication with said distribution site over said distribution medium, a distributed content architecture comprising:
a plurality of active content cells, each of said active content cells being external to said content distribution network and containing at least one digital asset and further containing metadata relating to said at least one of said digital asset; and
a content management server associated with said distribution site and further being in communication with each of said active content cells wherein said digital asset in each of said active content cells is initially non-communicable to said content management server and further wherein said metadata relating to said digital asset in each of said active content cells is initially communicable to said content management server at which an index of said digital asset in each of said active content cells, wherein said index has an index component respectively corresponding to said digital asset in each of said active content cells, is developed from said metadata from each of said active content cells such that at least one component of said index is selectable at any one of said interacting devices, said digital asset in one of said active content cells subsequently being communicable to said content management server to enable download of said digital asset of said one of said active content cells from said distribution site to one of said interacting devices upon selection of said component of said index corresponding to said digital asset of said one of said active content cells being made at said one of said interacting devices only in the event such selection is validated by said content management server as being in conformity with said metadata relating to one of said digital asset of said one of said active content cells.

2. A distributed content architecture as set forth in claim 1 wherein each of said active content cells has a unique IP address wherein a location of said IP address for each of said active content cells is registered with said content management server.

3. A distributed content architecture as set forth in claim 2 wherein communication between each of said active content cells and said content management server includes a transaction protocol, said transaction protocol being a set of functions overlaid upon a standard protocol.

4. A distributed content architecture as set forth in claim 3 wherein said set of functions includes at least one metatag class and further wherein said standard protocol is an XML protocol, said metatag class being embedded in said XML protocol.

5. A distributed content architecture as set forth in claim 4 wherein each of said active content cells includes a content store in which said digital asset of a same one of each of said active content cells is stored and wherein said metadata relating to said digital asset in each of said active content cells includes asset data management information, to which conformity is validated, that controls the manner in which said digital asset of said one of said active content cells is subsequently made communicable to said content manager.

6. A distributed content architecture as set forth in claim 5 wherein each of said active content cells further includes a transaction manager, said digital asset in said one of said active content cells being made communicable to said content management server upon indication of such selection being validated by said content manager server being received at said transaction manager of said one of said active content cells.

7. A distributed content architecture as set forth in claim 5 wherein each of said active content cells includes a media quality module, said metadata relating to said digital asset in each of said active content cells further including information relating to resolution of said digital asset in each of said active content cells stored in said media quality module of a same one of said active content cells.

8. A distributed content architecture as set forth in claim 5 wherein each of said active content cells further includes an asset index publishing module operative to provide from said metadata therein a catalogue searchable by said content management server.

9. A distributed content architecture as set forth in claim 2 wherein each of said active content cells registers its location with said content management server.

10. A distributed content architecture as set forth in claim 2 wherein a selected one of said active content cells registers said location for all of said active content cells.

11. A distributed content architecture as set forth in claim 4 wherein said metatag class includes metatags to determine distribution and manipulation of said metadata between each of said active content cells and said content management server.

12. A distributed content architecture as set forth in claim 4 wherein said metatag class includes metatags to determine communication of said digital asset from said one of said active content cells to said content management server and a format of said digital asset of said one of said active content cells.

13. A distributed content architecture as set forth in claim 4 wherein said metatag class includes metatags to determine validation of such selection and connection type between said one of said active content cells and said content management server.

14. A distributed content architecture as set forth in claim 1 wherein said content management server includes a transaction manager operative to control validation of such selection.

15. A distributed content architecture as set forth in claim 14 wherein said content management server further includes a content transaction engine operative to control monetary value transactions in the event validation requires conformity to metadata specifying monetary consideration for said digital asset of said one of said active content cells.

16. A distributed content architecture as set forth in claim 14 wherein said content management server further includes a content index engine operative to develop and publish in index of said digital asset contained within each of said active content cells.

17. A distributed content architecture as set forth in claim 14 wherein said content management server further includes a content search engine operative to search each of said active content cells for said metadata relating to said digital asset of each of said active content cells.

18. A distributed content architecture as set forth in claim 14 wherein said content management server further includes a content packaging engine operative to package said metadata from each of said active content cells for presentation in accordance with business rules.

19. A distributed content architecture as set forth in claim 14 wherein said content management server further includes a content retrieval engine operative to manage the transport medium over which said digital asset of said one of said active content cells is to be communicated from said one of said active content cells.

20. A distributed content architecture as set forth in claim 1 wherein said distribution medium further includes a commercial transaction engine operative to process electronically a monetary value transaction and further operative to transfer electronically monetary value for such transaction, wherein each of said active content cells includes a transaction manager, and further wherein said content management server includes a content transaction engine operative to control said monetary value transaction in the event validation requires conformity to metadata specifying monetary consideration for said digital asset of said one of said active content cells, said content transaction engine communicating said monetary value transaction to said commercial transaction engine, said commercial transaction engine communicating said monetary value to said transaction manager of said one of said active content cells, said digital asset in said one of said active content cells being made communicable to said content management server upon said monetary value being received at said transaction manager of said one of said active content cells.

21. A distributed content architecture as set forth in claim 20 wherein said monetary value communicated is an electronic token representative of said monetary value.

22. A distributed content architecture as set forth in claim 1 wherein said distribution network has at least one further distribution site wherein each of said interacting devices is further in communication with said one further distribution site over said distribution medium, said distributed content architecture further comprising at least one further content management server associated with said one further distribution site and further being in communication with each of said active content cells wherein said digital asset in each of said active content cells is also initially non-communicable to said one further content management server and further wherein said metadata relating to said digital asset in each of said active content cells is also initially communicable to said one further content management server at which an index of said digital asset in each of said active content cells, wherein said index has an index component respectively corresponding to said digital asset in each of said active content cells, is developed from said metadata from each of said active content cells such that at least one component of said index is selectable at any one of said interacting devices, said digital asset in one of said active content cells subsequently being communicable to one of said content management server and said one further content management server to enable download of said digital asset of said one of said active content cells from an associated one of said distribution site and said one further distribution site to one of said interacting devices upon selection of said component of said index corresponding to said digital asset of said one of said active content cells being made at said one of said interacting devices in communication with said associated one of said distribution site and said one further distribution site only in the event such selection is validated by one of said content management server and said one further content management server associated therewith as being in conformity with said metadata relating to one of said digital asset of said one of said active content cells.

* * * * *